(12) United States Patent
Geldermann et al.

(10) Patent No.: US 7,263,491 B1
(45) Date of Patent: Aug. 28, 2007

(54) ON-LINE DEGREE AND CURRENT ENROLLMENT VERIFICATION SYSTEM AND METHOD

(75) Inventors: J. Jeffrey Geldermann, Kenilworth, IL (US); Thomas D. McKechney, Lake Bluff, IL (US)

(73) Assignee: Credentials Inc., Northfield, IL (US)

( * ) Notice: Subject to any disclaimer, the term of this patent is extended or adjusted under 35 U.S.C. 154(b) by 291 days.

(21) Appl. No.: 10/860,854

(22) Filed: Jun. 4, 2004

Related U.S. Application Data

(63) Continuation of application No. 09/474,464, filed on Dec. 29, 1999, now abandoned.

(60) Provisional application No. 60/114,395, filed on Dec. 31, 1998.

(51) Int. Cl.
*G06Q 99/00* (2006.01)
(52) U.S. Cl. .............................. 705/1; 434/433; 705/76; 705/77; 705/18
(58) Field of Classification Search .................... 705/1
See application file for complete search history.

(56) References Cited

U.S. PATENT DOCUMENTS 6,149,438 A * 11/2000 Richard et al. ............. 434/322

OTHER PUBLICATIONS www.gcevaluators.com retrieved from wayback machine Jun. 14, 1998.□□.*

BusinessWire article; "PPTF and Med Advantage Join Forces; PPTF's aquisition of Med Advantage will provide superior credentialing services and substantial savings in administrative costs." Apr. 24, 1998.*
Milwaukee Journal Sentinel; "Checking of resumes grows as more dishonesty creeps in Verification services are more common in the 90's, as employers use caution." Jim Jordon; Nov. 4, 1998.*
Journal of Health Care Finance; "Trends in health care practitioner credentialing"I Aurthur Hernandez; Spring 1998.*

* cited by examiner

*Primary Examiner*—John G. Weiss
*Assistant Examiner*—Traci L. Casler
(74) *Attorney, Agent, or Firm*—Neal, Gerber & Eisenberg LLP

(57) ABSTRACT

The present invention provides a new and useful system and method for processing on-line degree and current enrollment verification inquiries. The system includes a requestor computer and an institutional computer each connected to a server computer via the Internet. The server computer is capable of processing and storing educational information/education records provided by the institutional computer, and receiving at least one inquiry from the requestor computer and providing educational information/education records in response to the inquiry. The system also includes a database for storing educational information/education records and a search engine module that searches for and retrieves educational information/education records from the database. Communication means are also included which allow the system to transfer data between the requestor computer and the institutional computer.

15 Claims, 20 Drawing Sheets

ANNOUNCEMENTS

Background

Overview — 82

Pricing

Try a Demo

Security &
Your Browser

Service Agreement

Site Use Terms

Schools — 82

Other Links

Privacy Policy

Welcome to our patent-pending, real-time system for verifying College & University degrees, honors, majors, minors and dates of attendance.

AACRAO CORPORATE MEMBER

Degreechk.com is your direct link to accurate verification of academic credentials with written confirmation provided on all inquiries.

If you are already an enrolled user, please Sign On — 84

Otherwise, before using this service, you must Enroll — 86

If you have suggestions, please Send us an E-mail

Registrars click here for more information on degreechk.com

VeriSign Secure Site Click to verify

Copyright© 1999 Credentials LLC, All Rights Reserved
550 Frontage Road
Northfield, IL 60093, USA
Tel: (847) 446-7422

FIG. 3

Subject: Degree Research /8J300840/
Date: Sat, 26 Sep 1998 12:36:16 +0000
From: tracker@S1028LPM.DEGREECHK.COM
To: registrar@degreechk.com

／―145

ATTENTION . . . Registrar at Sample University

A degree verification request ( ID=8J300840 ) as described below
has not been satisfied by the information contained
in the Credentials degreechk.com databases.

A final determination as to whether your institution conferred
a legitimate degree on the identified candidate is required.

If you have any questions regarding this request,
please call our Customer Support at 800-646-1858.

Your timely attention to this matter is appreciated.

Thank you,
degreechk.com           ／―123

| Search Item : | You Entered : | Search Result : |
|---|---|---|
| School : | Sample University | |
| Social Sec# | 333445555 | Matched |
| Birth Date : | 05021952 | No Match |
| Candidate Name : | | We matched the 1st |
| First Name : | ANYT | 3 characters |
| Middle Name : | OLD | 3 characters |
| Last Name : | STUDENT | 7 characters : |
| Other Name : | | We matched the 1st |
| First Name : | | |
| Middle Name : | | |
| Last Name : | | |

Verification Requested on Behalf of :
CREDENTIALS LLC

The inquiring party has provided the following
additional information to facilitate this search :

Degrees and Years Conferred :   ／―128
BACHELOR OF SCIENCE-1982

Other relevant information :
DFGHDFHGDFGHDFGHDFGHDGFHDFGHDFGHDGFHDGFHDGF

FIG. 14A

Subject: Degreechk.com - Confirm 8KJ00887
Date: Fri, 9 Oct 1998 15:16:40 +0000
From: VERIFIER@S1028LPM.DEGREECHK.COM
To: tmckechney@degreechk.com

*— 121*

*— 122*

Your degree verification request was assigned Confirmation Number 8KJ00887.

If you have a question regarding the billing for this transaction, or if you need to perform additional searches for this same degree verification request, you will need the Confirmation Number shown above.

For assistance please call Credentials LLC - Customer Support at 800-646-1858.

We hereby confirm that the individual identified by
Social Security Number 333445555 was awarded the
following degree(s) by Sample University :

The following table provides detailed information associated with our processing of your Degree Verification Request. Please examine this information carefully. If you entered any information incorrectly, then the results of our search may not be accurate for your purposes.

If you entered a Social Security Number and we matched it successfully, please use the other information in the table to certify that our results match the individual you believe you are verifying.

If you did not enter a Social Security Number and we were not able to verify a degree, it may be because we could not match the last name and date of birth exactly. The specific number of characters we were able to match is shown below.

*— 123*

| Search Item : | You Entered : | Search Result : |
|---|---|---|
| School : | Sample University | |
| Social Sec# | 333445555 | Matched |
| Birth Date : | | Matched |
| | | |
| Candidate Name : | | We matched the 1st |
| First Name : | ANY | 3 characters |
| Middle Name : | OLD | 3 characters |
| Last Name : | STUDE | 5 characters : |
| | | |
| Other Name : | | We matched the 1st |
| First Name : | | |
| Middle Name : | | |
| Last Name : | | |

Verification Requested on Behalf of :
CLLC

FIG. 14B

ON-LINE DEGREE AND CURRENT ENROLLMENT VERIFICATION SYSTEM AND METHOD

CROSS-REFERENCE TO RELATED APPLICATIONS

This application is a continuation of the U.S. patent application Ser. No. 09/474,464, which was filed on Dec. 29, 1999 now abandoned and which claims the benefit of provisional Patent Application No. 60/114,395, filed Dec. 31, 1998.

BACKGROUND OF THE INVENTION

1. Field of the Invention

The present invention relates generally to the process in which businesses make inquiries of institutions of higher education such as, colleges, universities, junior colleges, technical colleges and community colleges, for the purpose of verifying academic credentials of past students and graduates or the present enrollment status of current students.

2. Description of the Prior Art

More specifically, this invention pertains to information systems and networks which allow for efficient on-line access to educational records at many Institutions (also referred to herein as "schools") as an alternative to the current manually intensive methods of telephone inquiries and printed forms.

As a standard course of business, employers, insurance companies, credit card issuers, recruiting firms and background screening firms routinely contact educational institutions for the purpose of verifying academic records relating to individuals who have applied for employment, credit or insurance benefits. The requested information is a necessary component to credit underwriting and claims processing functions with credit card issuers and insurance companies. For employers, the process of verification is a critical component of evaluating the qualifications and integrity of the employment candidate. Failure to verify can often increase a company's exposure to liability and malpractice litigation. From a business standpoint, this process of verification is usually considered slow and expensive. Moreover, businesses are poorly equipped to locate universities that have esoteric names and/or do not have a clear affiliation with a state or well-known city. The process of "finding" an Institution may involve repeated calls to directory assistance. Once the institution is located, the business must contend with vacation schedules and office hours that do not necessarily correspond with generally accepted business hours.

It is estimated that educational institutions in the United States receive more than 30,000 requests for educational record information each working day and that this number is continually increasing. These "verification" requests are typically made over the telephone where the identity of the requester or the validity of the request is rarely verified. In fact, records of these requests are rarely kept due to the manually intensive nature of this process. In a small number of cases, the requests are made in writing for the Institution to complete and return. As a result of escalating costs associated with verification requests, University Registrars are faced with the task of responding to the escalating volume of requests with limited staff resources. Consequently, response time at most schools is limited by staff availability. In some cases, Institutions simply refuse to respond to requests, much to the detriment of current students and graduates.

Current regulations known as the Family Educational Rights and Privacy Act ("FERPA") protect the educational records of all graduates and students in the United States. In addition to setting guidelines for the handling and maintenance of individual educational records, FERPA defines which elements of a student's educational records are considered "directory information" (public) and which elements are considered "personally identifiable" (private). The present invention assists universities and businesses in complying with FERPA in that no "personally identifiable" information is ever disseminated. Moreover, the on-line degree and current enrollment verification system enhances institutional compliance with FERPA by providing a permanent record of all such inquiries.

What is needed in the marketplace, is a single entity, which not only provides businesses with easily accessible, low-cost and accurate access to the educational records of individuals who are applying for services or employment, but which also supplies written confirmation of the transaction in a timely manner. Further, Institutions of Higher Education need a means for providing responses to inquiries more rapidly, accurately and in compliance with FERPA without using increasingly scarce human resources to do so. Tracking degree verification inquiries will benefit the general business practices of Institutions by providing student lending officers and career development officers with improved data on demographic information for graduates.

As a result of these noted deficiencies in the prior art, it is an object of the present invention to provide an on-line degree and current enrollment verification system.

SUMMARY OF THE INVENTION

In accordance with the present invention, an on-line degree and current enrolment verification system, is described. The system includes a requestor computer and an institutional computer each connected to a server computer via the Internet. The server computer is capable of processing and storing educational information provided by the institutional computer, and receiving at least one inquiry from the requestor computer and providing educational information in response to the inquiry. The system also includes a database for storing educational information and a search engine module that searches for and retrieves educational information from the database. Communication means are also included which allow the system to transfer data between the requestor computer and the institutional computer.

The foregoing features and advantages of the present invention will be apparent from the following more particular description of the invention. The accompanying drawings, listed hereinbelow, are useful in explaining the invention.

BRIEF DESCRIPTION OF THE DRAWINGS

FIG. 3 shows a screen configuration for a Home Page displayed on a user computer after accessing one embodiment of the system in accordance with the present invention.

FIG. 14a shows an example of an e-mail referral to a hypothetical registrar regarding an unconfirmed verification inquiry.

FIG. 14b shows an example of an e-mail forwarding search results to a hypothetical requester.

DETAILED DESCRIPTION OF THE PREFERRED EMBODIMENT

While this invention is susceptible of embodiments in many different forms, there is herein described in detail, a preferred embodiment of the invention with the understanding that the present disclosure is to be considered as an exemplification of the principals of the invention and is not intended to limit the broad aspects of the invention to the embodiments illustrated herein.

I. System Overview

Figure 1:
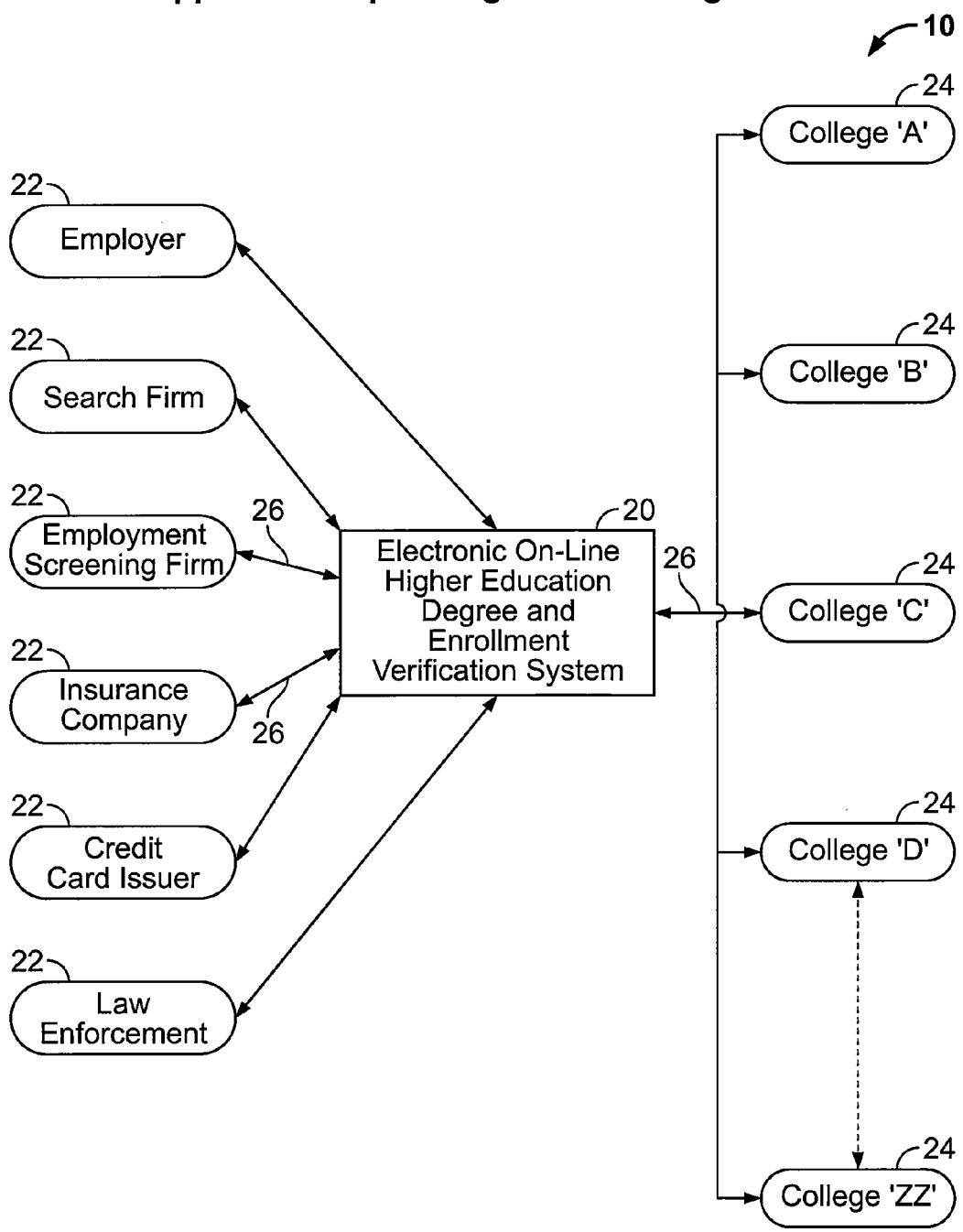
FIG. 1 is a high-level conceptual view of the system showing requestor computers, institutional computers and the server computer connected via the Internet.
Figure 2:
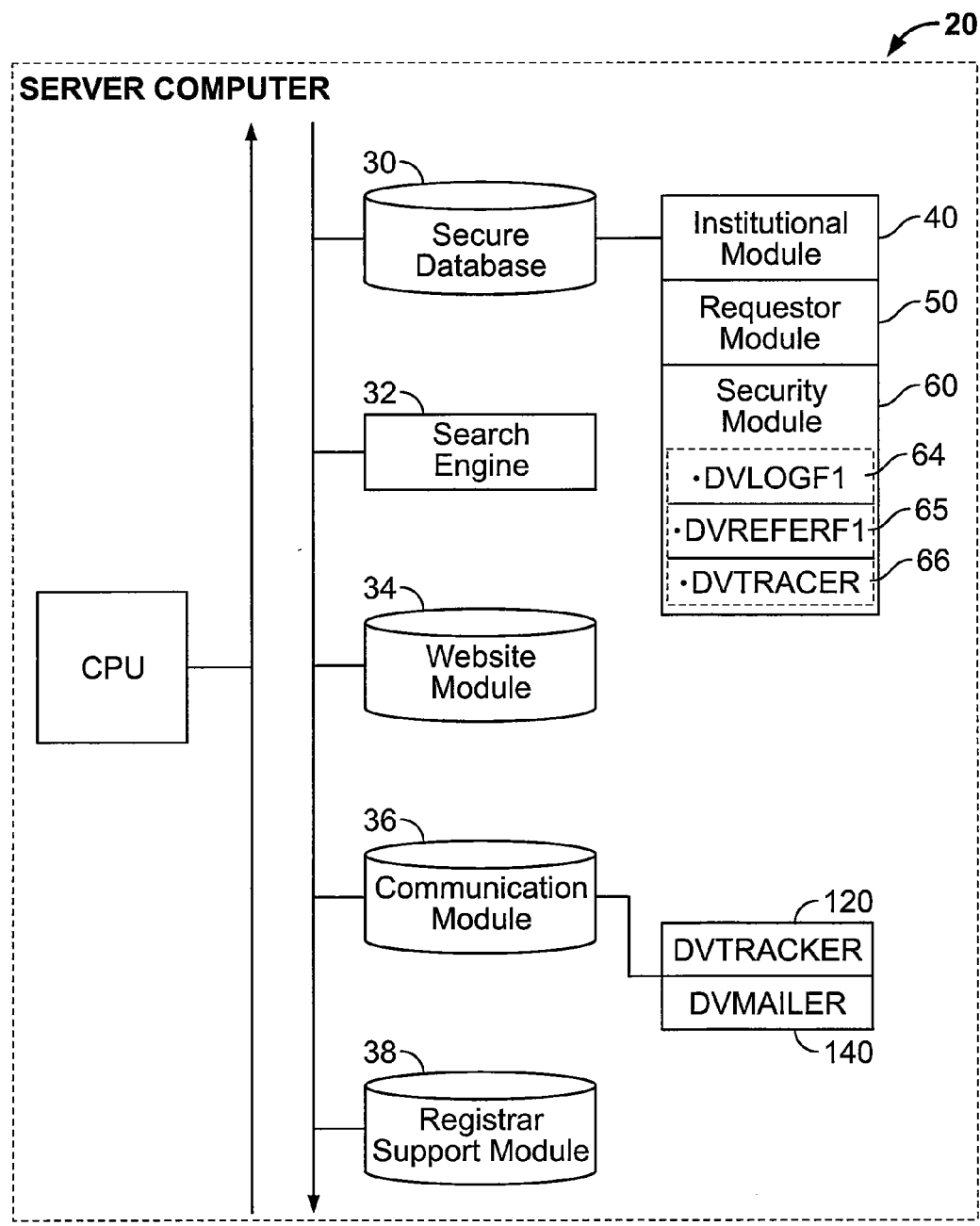
FIG. 2 is a block diagram of the server computer in one embodiment of an online degree and current enrollment verification system in accordance with the present invention.
Figure 4:
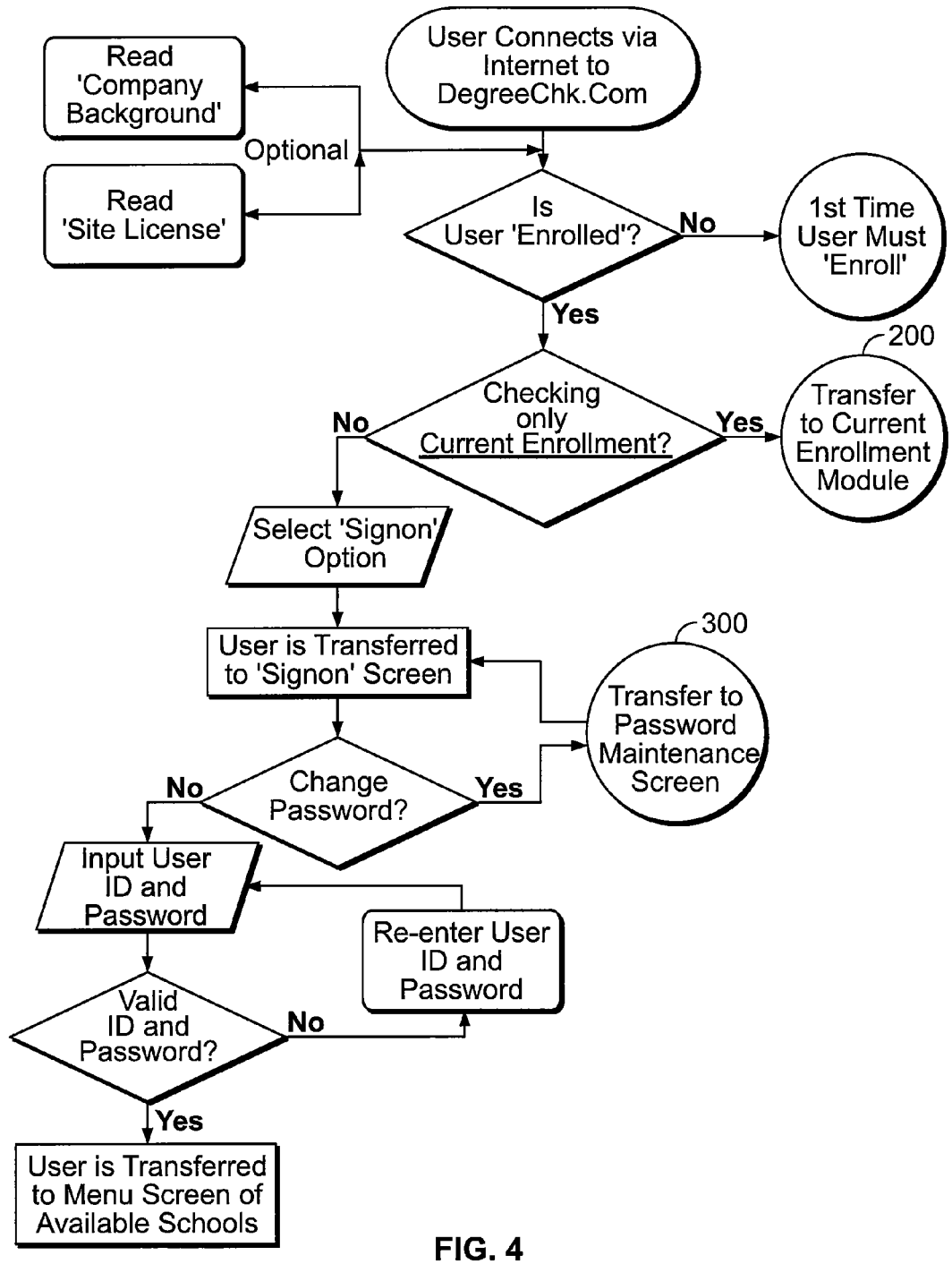
FIG. 4 is a flow chart diagram showing the sequence of events and user options available on one embodiment of the system's "Home Page."

As shown in FIG. 1, the preferred embodiment of the on-line degree and current enrollment verification system 10 is comprised of a server computer 20 that is connected to requestor computers 22 and institutional computers 24 via a global communications network 26. The combination of these elements form the present invention which provides an interactive, on-line system 10 whereby a user, i.e., a business or entity that inquires about individuals who claim to be enrolled as students at an educational institution or who claim to have received degrees from the institution, can verify degree and enrollment information for a particular individual. The requestor computers 22 and the institutional computers 24 are merely remote computers that are connected to the system 10 via the Internet and that are capable of sending and receiving information to and from the server computer 20. For purposes of this application, the term "sending" shall mean delivering information by e-mail, facsimile or U.S. mail, and all references to one of these means for sending information shall be viewed as including all methods for sending such information. The server computer 20 is comprised of 5 major components: (1) a secure database 30; (2) a search engine 32; (3) a website module 34; (4) a communication module 36; and (5) a Registrar Support Module 38.

1. The Secure Database

The secure database 30 is comprised of three interactive modules: (a) an institutional module 40, (b) a requestor module 50 and (c) a security module 60. These three modules allows the secure database 30 to store educational information on current students and graduates, to communicate with requesters and to track verification inquiries to the system. The secure database 30 is an "open ended" structure which means that it allows any number of degrees, honors, concentrations and names to be associated with a single graduate or student.

A. The Institutional Module

The institutional module 40 contains the information needed for college and university MIS staff to prepare data files for submission and processing. Moreover, the interface specifications for the institutional module 40 require a specific structure for the enrollment and conferred degree records contained within the institutional module 40. For example, the institutional module 40 is designed to accommodate a broad spectrum of different types of data used in the degree verification and enrollment verification processes. Therefore, the institutional module 40 assumes that not all data systems store student names in separate fields, i.e., first, middle and last name suffix formats, and that the infinite number of degree titles could never be defined in a coded structure. To accommodate the enrollment and conferred degree records the database structure allows for a number of different input arrangements for student names, and requires that degrees be explicitly described in a text string, i.e. whatever the institution includes as the degree description is what the system will report as a conferred degree.

In order to handle the wide variety of degree descriptions, the degree description field is characters in length. This field is carried in a DB2 database as a variable length text field with a minimum, reserved size of 50 characters. This allows the system to properly store and process virtually any degree description. In designing the records, the name field has been placed at the end of each record. This allows schools to truncate these fields with a carriage return when preparing the files for transmission to or storage on external memory devices, such as zip disks, and for submission and processing by the system 10.

B. The Requestor Module

The requestor module 50 of the system 10 is a by-product of the User Enrollment function. Specifically, as users enroll in the system 10 via the website module 34, they populate this database with information that is critical to the other interacting parts of the system 10. For example, the requestor module 50 is populated with identifying information, such as, requestor names, business affiliations, addresses, phone numbers, fax numbers, e-mail addresses, industry identifiers and billing information. The identifying information allows the system 10 to communicate with the requestor computer 22 or the institutional computer 24 via e-mail or facsimile transmission, charge designated credit card accounts, communicate with groups of requesters and generate transaction records 52 for participating institutions. These transaction records 52 can be used to identify the source of verification inquiries. The identifying information can also be used to report back to institutions, to provide discreet transaction reports to requestors and to assist with billing services. In addition, analysis and reporting of industry trends in degree and enrollment verification will be based, in part, upon statistical information compiled in the Requestor Module 50.

C. The Security Module

The security module 60 of the system is where verification inquiries are accounted for, logged and tracked. The security module 60 is comprised of several sub-modules, e.g., the DVLOGF1 sub-module 64, the DVREFERF1 sub-module 65 and the DVTRACER sub-module 66. The sub-modules allow the security module 60 to assign unique audit trails to inquiries, to log data 100 and to store journal records 102 for verification transactions. The DVLOGF1 submodule 64 stores log data 100 and journal records 102 which are used to balance and reconcile bank deposits and receivables accounting systems. The DVREFERDF1 sub-module 65 tracks and ages "pending" inquiries that have been referred to the registrar. The DVTRACER sub-module 66 actually assigns unique audit trail numbers to verification inquiries that serve as reference points when users elect to "refine" searches after the fact or call for customer service issues relating to search results.

2. The Search Engine

The system 10 also includes a unique and proprietary search engine 32 that processes inquiries which are submitted by requester computers 22. Users, in conjunction with the requestor computers 22, submit verification inquiries to the system 10 where said verification inquiries are comprised of a plurality of search constraints which are provided by the users. The logic utilized by the search engine 32 is hierarchical in nature with regard to the search constraints that are provided by the user.

The process of verifying a degree involves comparing multiple search constraints provided by the user against the information contained in the system's 10 secure database 30. The primary search constraints 72 for verification inquiries are listed below in order of importance:

School FICE Number (FICE)
Social Security Number (SSNO)
Last Name (LNAME)
Other Last Name (OLN)
Date of Birth (DOB)

The secondary search constraints 74 available to this process are as follows:

First Name (FNAME)
Middle Name (MNAME)

The search constraints are considered in two groups because of their significance within the search algorithm. The search algorithm is based upon a series of attempts to match the provided search constraints with the information stored in the system's 10 secure database 30. The results of these inquiries are prioritized based on how closely the search constraints and the educational information stored on the secure database 30 match.

Although most search constraints can be edited at any time, the School (FICE) and all other numeric fields, i.e., SSNO and DOB, become unalterable by the user once an inquiry has been submitted. This feature is a safeguard against spurious attempts to find valid Social Security Numbers on record at Institutions that might be used for illegal purposes. Typographical errors in these fields can only be corrected with authorized intervention by a system supervisor.

Examples of inquiries by users and comments regarding verification inquiry results for varying search constraints are detailed in the following case examples:

Case 1: Exact match on FICE, SSNO, and LNAME and/or OLNAME fields. If an exact match for these fields is achieved, a result with a 100% accuracy rating can be returned.

Case 2: Exact match on FICE, SSNO and "subset" match on LNAME and/or OLNAME fields. This example is almost identical to case 1, except that since the system 10 could not find an exact match on LNAME when testing Case 1, the system 10 now checks to see if the LNAME field is a subset of the user's input LNAME. This example deals with the situation of when a last name is changed because of marriage hyphenation, i.e., the user inputs the LNAME as JONES-DECKER and either JONES or DECKER is stored in a degree record with the exact FICE and SSNO. In this situation, an accuracy rating of almost 100% can be returned.

Case 3: Exact match on FICE, SSNO and a "like match" on the full LNAME and/or OLNAME fields. This example deals with the situation in which the user has been given a single, non-hyphenated last name and the secure database 30 contains a larger hyphenated last name, i.e., the user has inputted JONES but the secure database 30 contains JONES-DECKER. In this example, the system 10 is looking to see if the string "JONES" is contained anywhere in the LNAME fields. If the system 10 finds this situation to be true, a result with an accuracy rating of nearly 100% can again be returned.

Case 4: Exact match on FICE, SSNO and a partial match on the LNAME or OLNAME fields. This example deals with the situation in which the user has entered a last name that is misspelled. The system 10 will check character-by-character starting with the first character of the LNAME fields. If there are any matches at all, the system 10 will report the results to the user. More particularly, the system 10 will report that an exact match on the School and Social Security Number was found, but that the system 10 was only able to match the first 'x' characters in the last name provided by the user with the last name contained in the secure database 30. The system 10 will prompt the user to recheck the spelling provided for the last name. The user may alter the spelling of the last name and resubmit the request a total of five (5) times without being charged again.

This limit is intended to eliminate spurious attempts to randomly match names or strings of letters with Social Security Numbers. If the system 10 finds a last name that matches a last name contained in the secure database 30, a result with an accuracy rating of nearly 100% can again be returned.

Cases 1, 2, 3 and 4 are the only searches that generate results with a 100% or "near 100%" accuracy rating. The cases that follow are based upon getting a substantial match on other search constraints.

Case 5: Exact match on FICE, LNAME or OLNAME, and DOB fields. Although an infrequent practice and not recommended, legitimate searches may be conducted without the benefit of a social security number. First, the search attempts to achieve an exact, letter-by-letter match of the LNAME or OLNAME field. If achieved, the search then proceeds to find an exact match on the DOB. If successful in matching the DOB, the third and final step is to achieve at least a partial match on the FNAME. If all these conditions are met, then the system 10 can return a highly reliable confirmation. If the conditions are not met, the user may refine the search by changing alpha fields only, i.e., LNAME, OLNAME or FNAME; the alpha fields can only be changed a maximum of five (5) times.

3. The Website Module

The main interface between the requestor computers 22, the institutional computers 24 and the system 10 is provided by the website module 34 as the system 10 "Home Page" 80. Specifically, the website module 34 is run by the server computer 20 and accessible by the requestor computers 22 and the institutional computers 24 with standard web browsers. Further, when users access the website module, the Home Page 80 is displayed on the users' computer. The Home Page 80 acts as a roadmap to all of the system 10 functions by including a multitude of hyperlinks 82 to other web pages that embody additional system functions. Users can, therefore, access a variety of system functions by selecting the appropriate hyperlink 82 and thereby entering the respective web page. Moreover, since the server computer 20 and the Home Page 80 are always running, users will have access to the enrollment and conferred degree records three hundred sixty-five (365) days a year and twenty-four (24) hour-a-day. Several examples of system functions which are included in the preferred embodiment of the present invention are provided below.

The system functions utilize event-driven programming techniques, which means that program instructions are executed based on the activity of a user, i.e., an event, such as depressing a key or clicking the mouse. In event driven applications, all programming is based on defining the response to the event. Consequently, the drawing figures that illustrate program flow for the various applications of the system are not intended to show traditional program logic. Rather, the flow charts assume that the user makes specific selections, then describe an overall flow based on those events. All user communications with the website module 34, except the Home Page 80, shall be fully encrypted according to the current standards prevailing in the United States.

Figure 5:
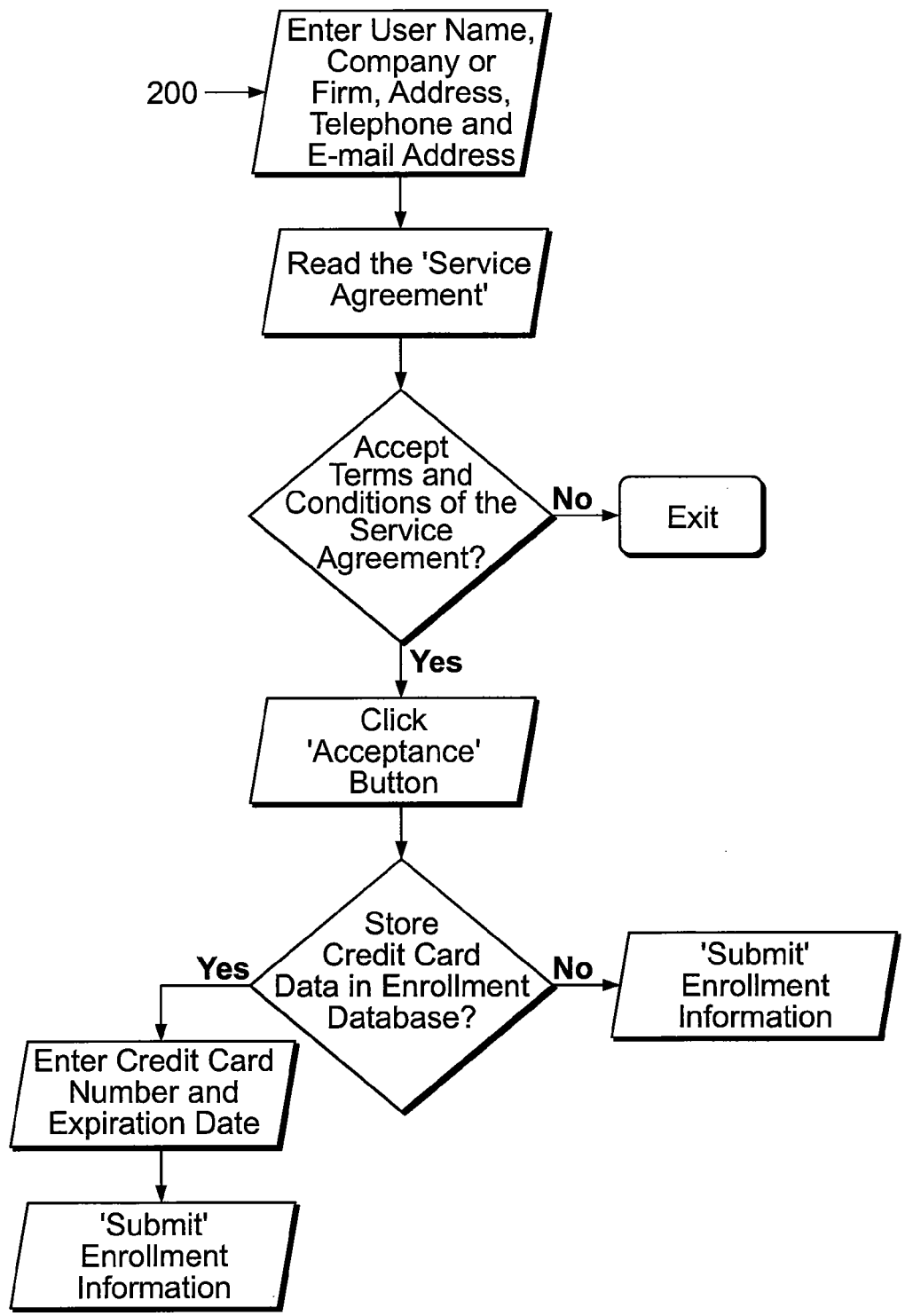
FIG. 5 is a flow chart diagram showing the sequence of events and user options available on one embodiment of the system's "User Enrollment" module.
Figure 6:
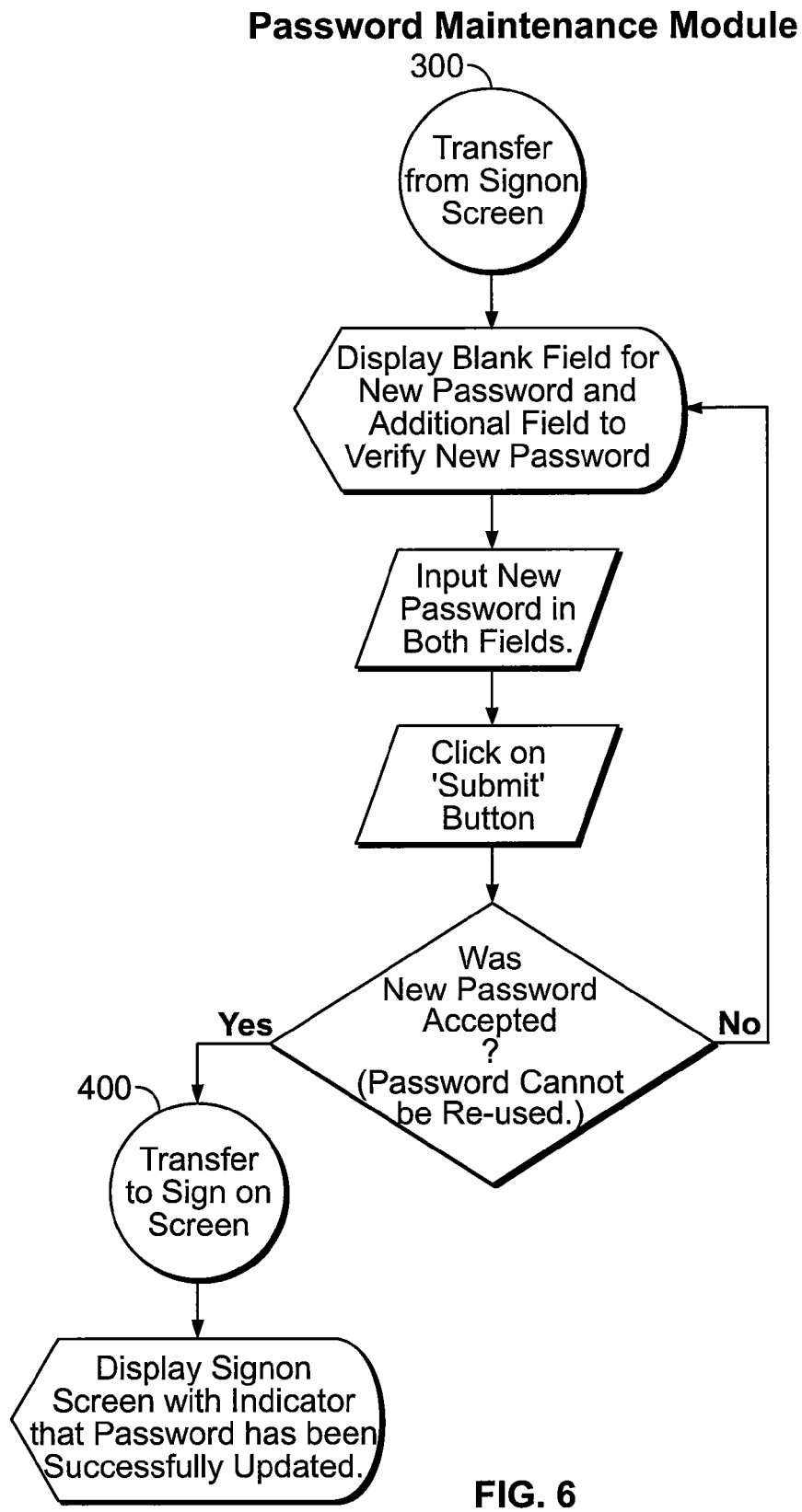
FIG. 6 is a flow chart diagram showing the sequence of events and user options available on one embodiment of the system's "Password Maintenance" module.
Figure 7:
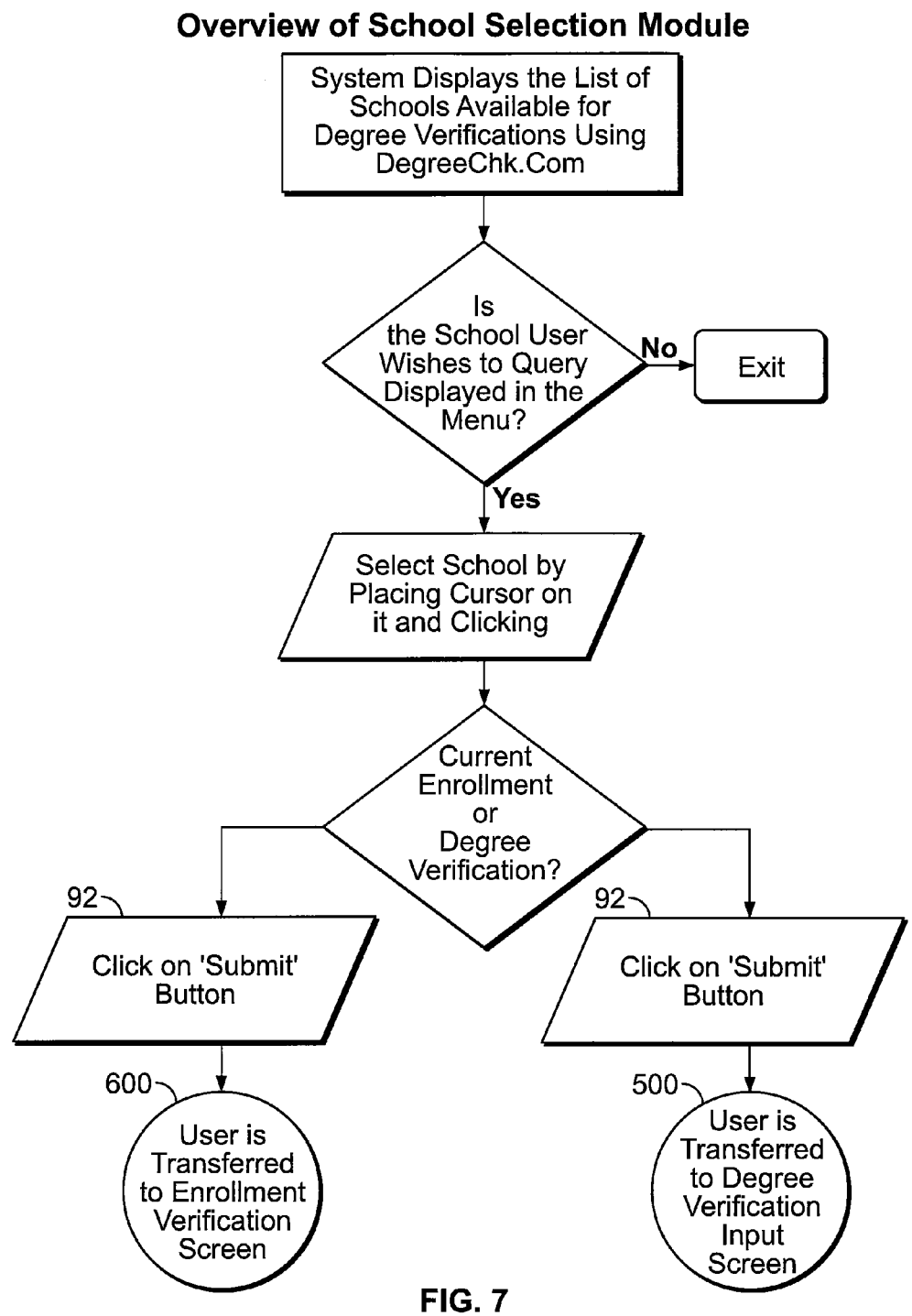
FIG. 7 is a flow chart diagram showing the sequence of events and user options available on one embodiment of the system's "School Selection" module.
Figure 12A:
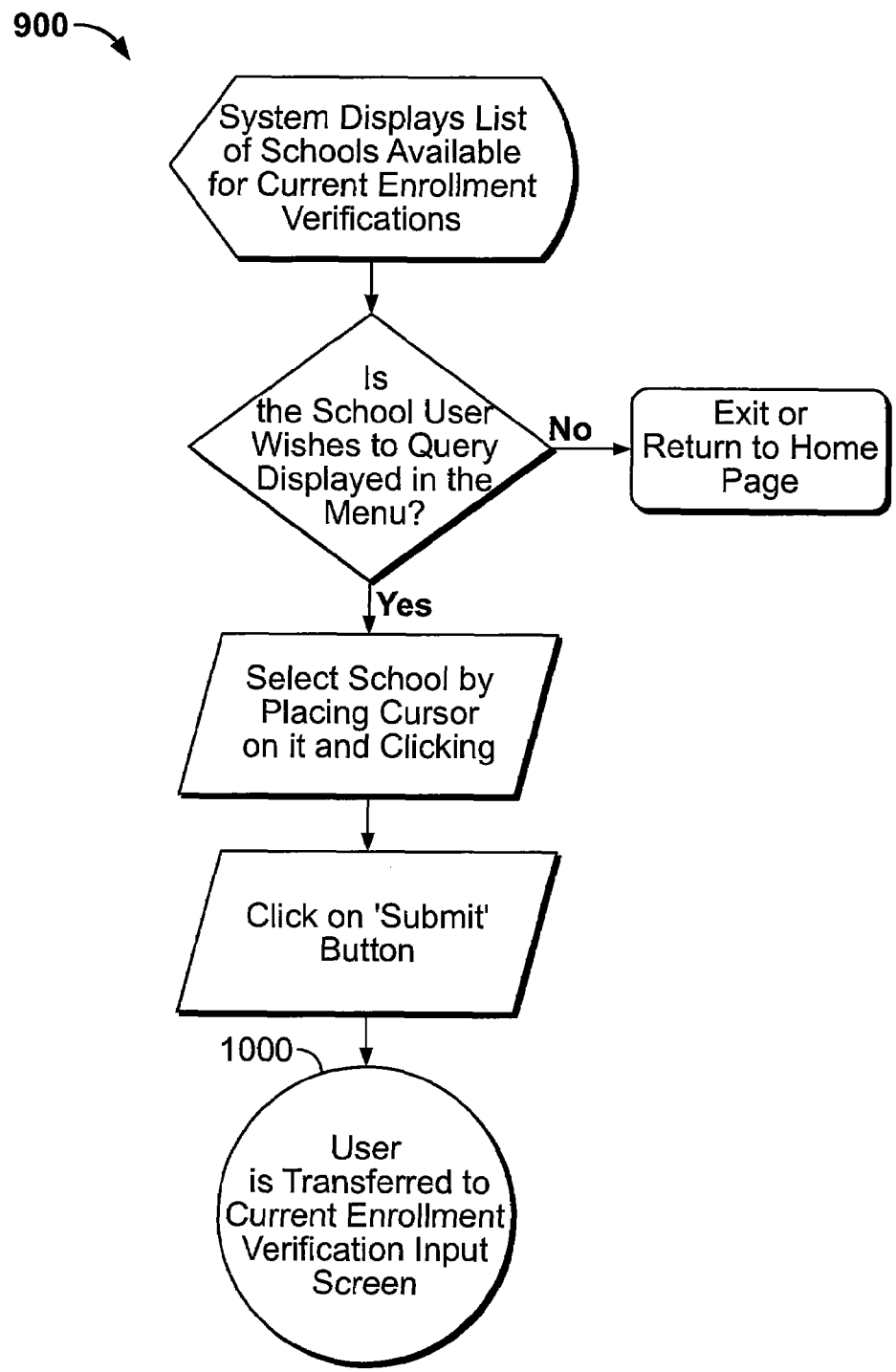
FIG. 12a is a flow chart diagram showing the sequence of events and user options when the user has chosen to verify the current enrollment of a student, as opposed to verifying the degree of a graduate of the school.

To begin using the on-line current enrollment and degree verifications system 10, the user activates the requestor computer in the conventional way and then connects to the Internet through their Internet Service Provider ("ISP") using standard web browser software. By entering the Uniform Resource Locator ("URL") address "www.degreechk.com," the user accesses the Home Page which facilitates interaction with the online current enrollment and degree verification system 10. As shown in FIG. 3, the Home Page 80 will feature multiple hyperlinks 82 that access company background information, help screens, the website License Agreement, the sign-on web page 84 and the enrollment web page 86. First time users are required to enroll. As shown in FIG. 5, this process requires the user to provide identifying information, information about the firm the user represents and contact information. If desired, the user may also provide credit card information to facilitate billing. Users are only required to enroll once. Once enrolled the user is required to sign-on each time the user accesses the system 10. A discreet user ID and password, chosen by the user during enrollment, are required to access the system 10. As shown in FIG. 6, systemic controls require the user's password to be changed periodically. As shown in FIGS. 7 and 12a, if entered successfully, the user will interact with the "school selection" menu, which consists of a drop-down menu listing all participating educational institutions. The User must scroll through the menu and then select a particular school by highlighting it and clicking on the 'Submit' button 92.

Figure 8:
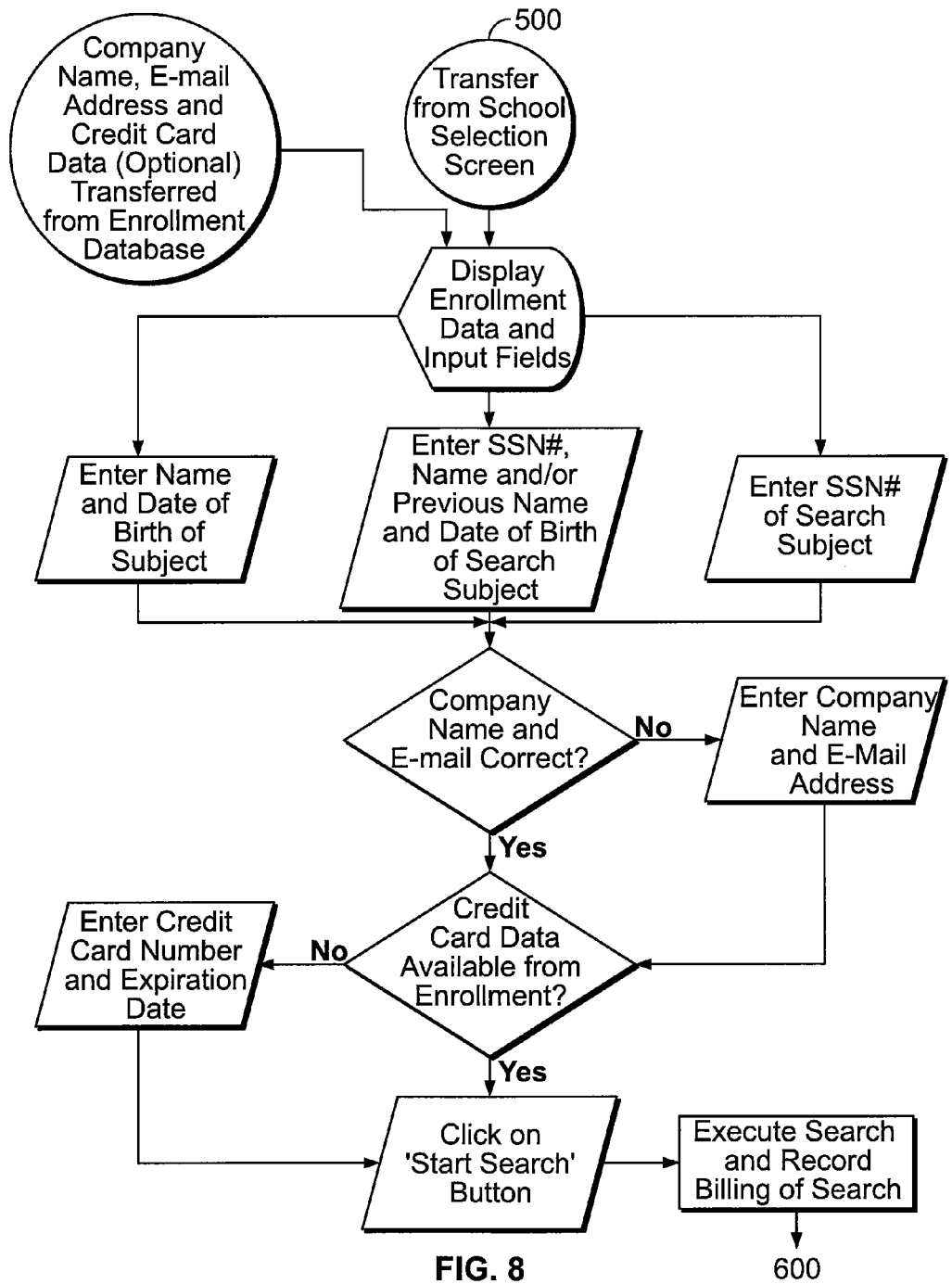
FIG. 8 is a flow chart diagram showing the sequence of events and user options available on one embodiment of the system's "Degree Verification Input" module.
Figure 12B:
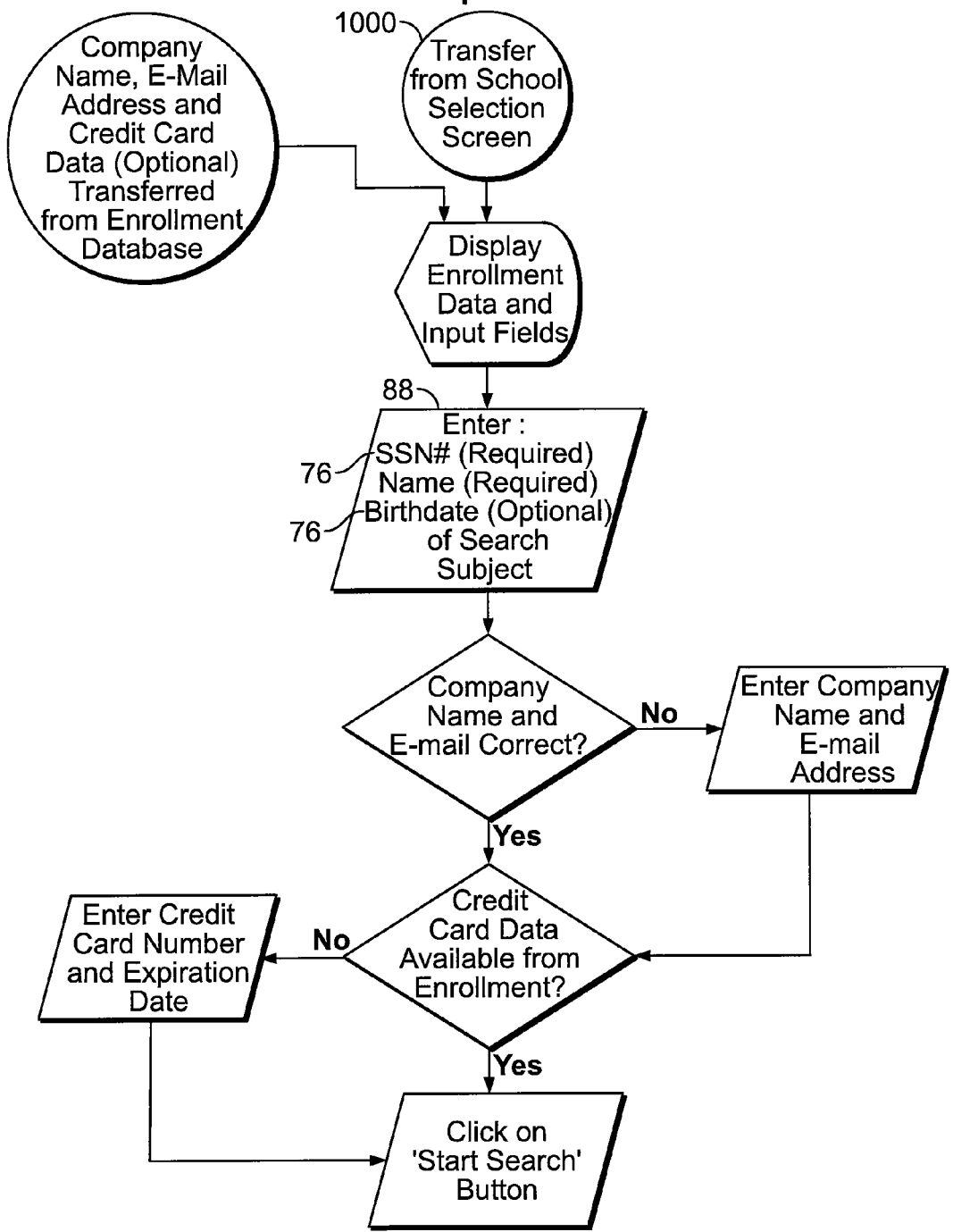
FIG. 12b is a flow chart diagram showing the sequence of events, user options and input fields required to submit a verification inquiry regarding the current enrollment of a student to the system.

After selecting an educational institution or school, an input screen is presented to the user. This input screen enables a user to query the secure database 30 for verification of current enrollment of a student, or degrees and/or dates of attendance of a graduate of the school. As shown in FIGS. 8 and 12b, this screen also contains information from the enrollment database 87 to confirm the entity for which the verification is being performed and the e-mail address to which a confirmation of the transaction will be directed. The user is also prompted to input search constraints that will facilitate the verification of the enrollment and conferred degree records. The available input fields 76 include First Name, Middle Name, Last Name, Other Last Name, Social Security Number and Date of Birth. Once entered, the user must click on the "Submit" button 92.

Figure 9A:
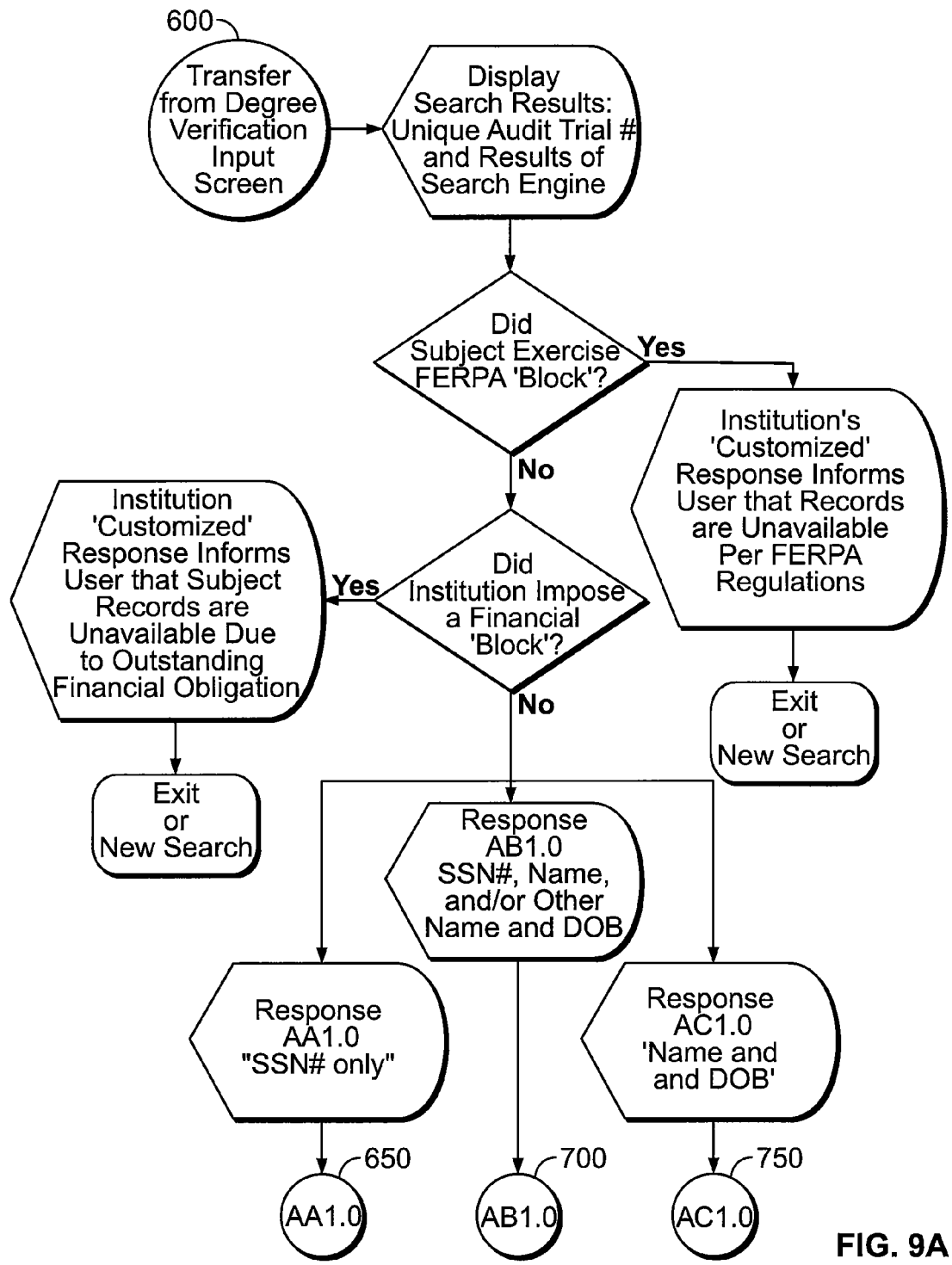
FIG. 9a is a flow chart diagram showing the sequence of events, user options and possible outcomes of the "Search Results" module.
Figure 9B:
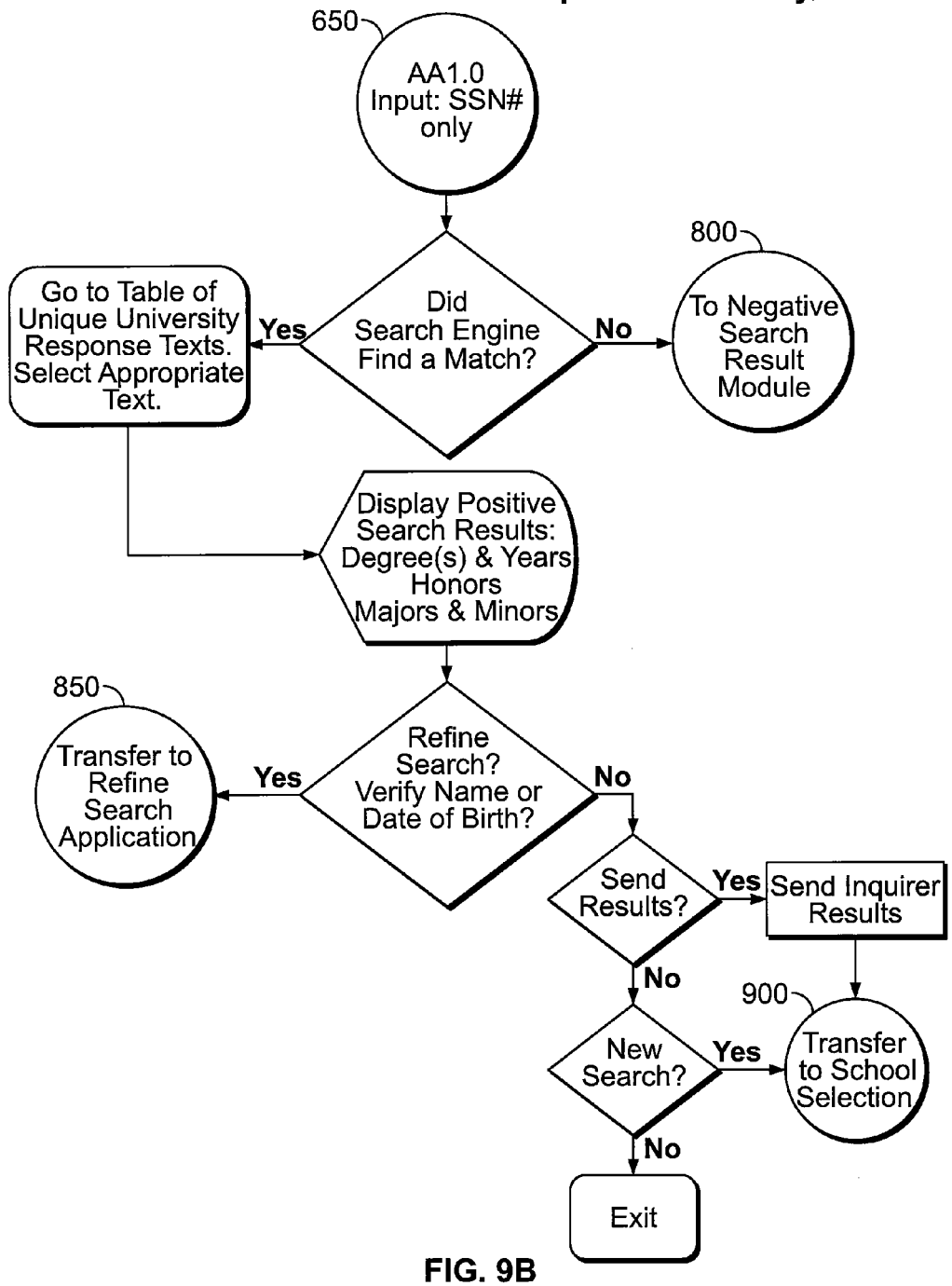
FIG. 9b is a flow chart diagram showing the sequence of events and user options resulting from a positive match being achieved where only the subject's social security number was submitted as an input field.
Figure 9C:
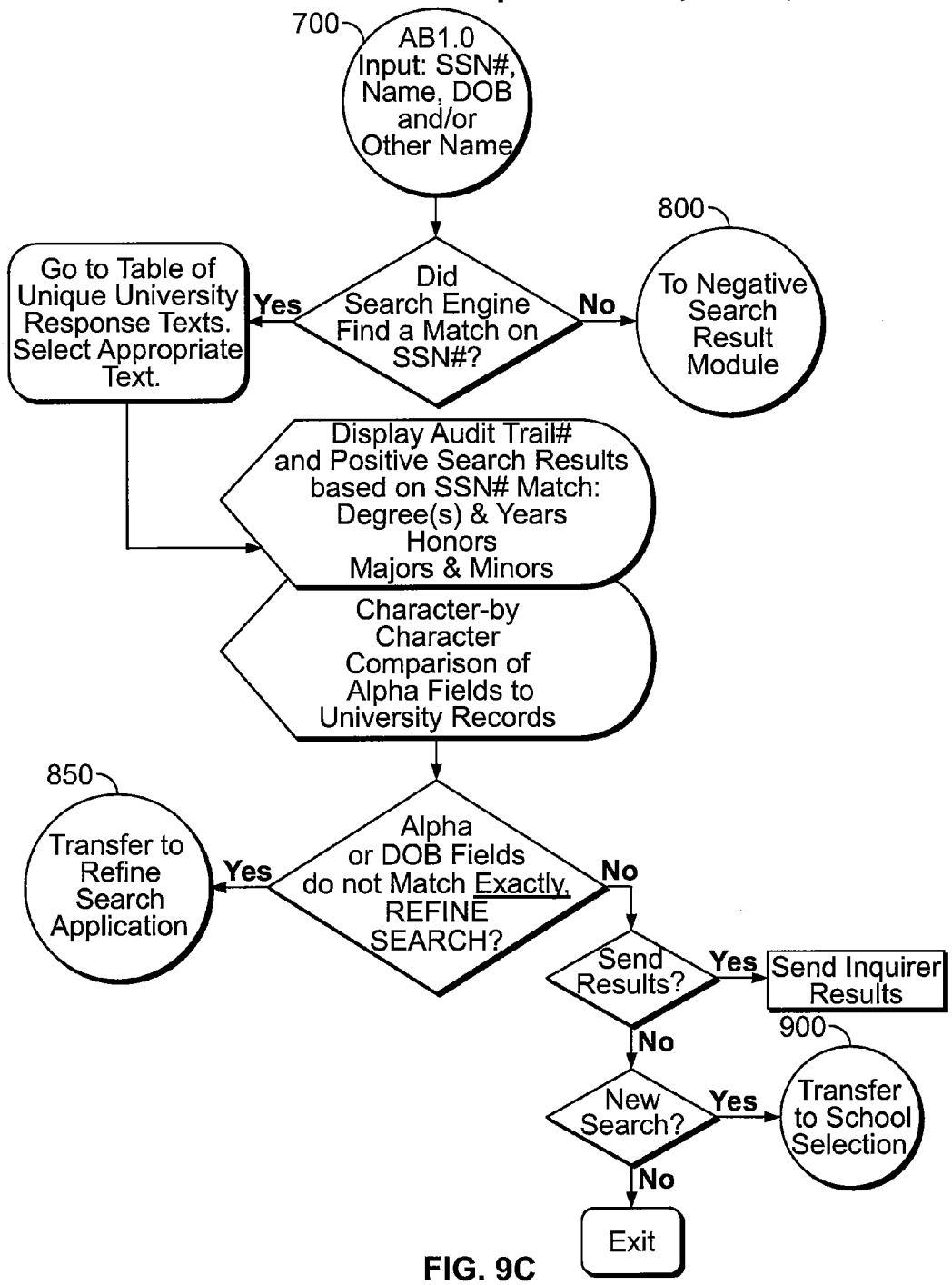
FIG. 9c is a flow chart diagram showing the sequence of events and user options resulting from a positive match being achieved where the subject's social security number, Name, Date of Birth and/or Other Name were submitted as an input field.
Figure 9D:
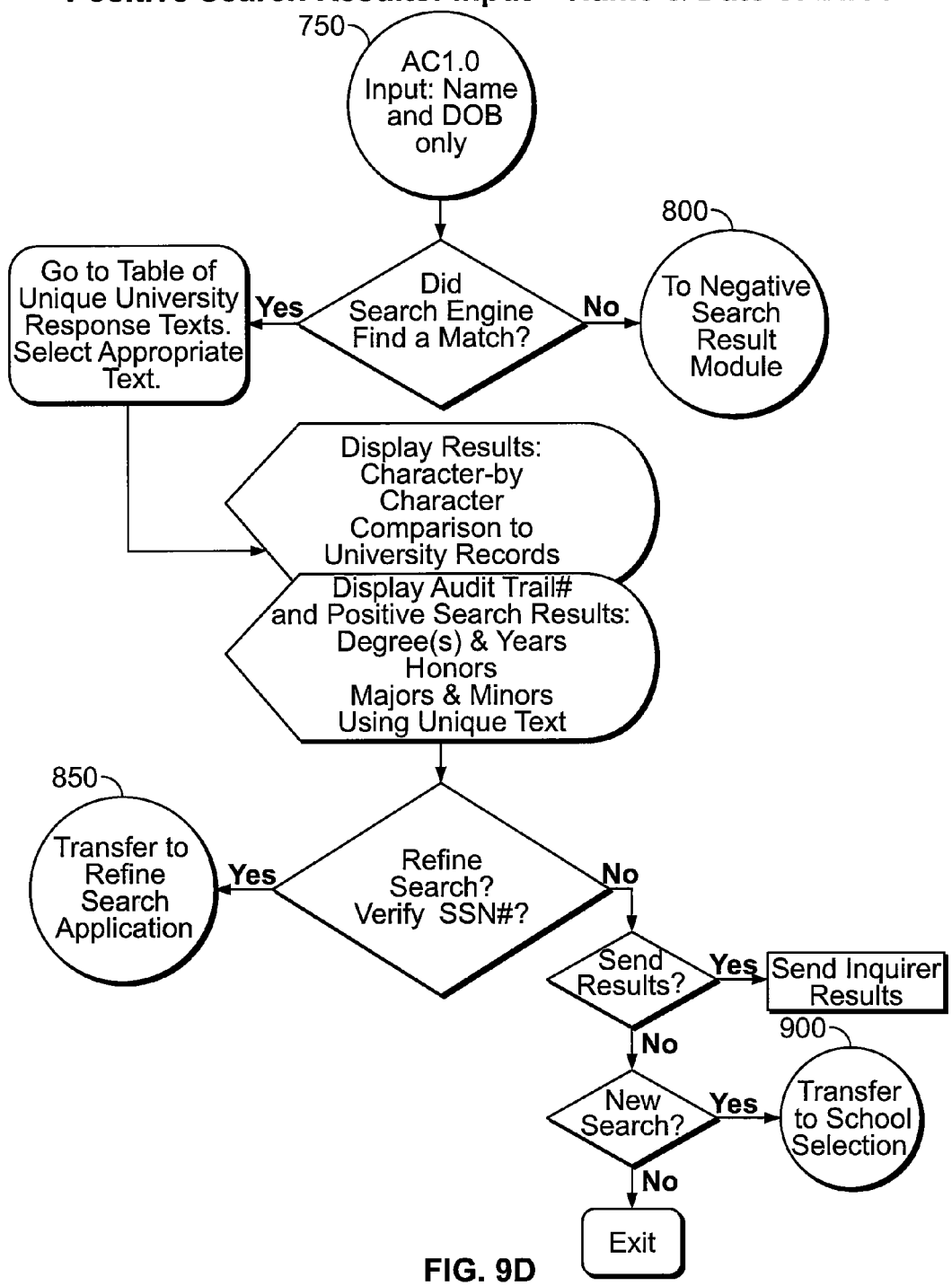
FIG. 9d is a flow chart diagram showing the sequence of events and user options resulting from a positive match being achieved where the subject's Name and Date of Birth were the only elements submitted as an input field.
Figure 11:
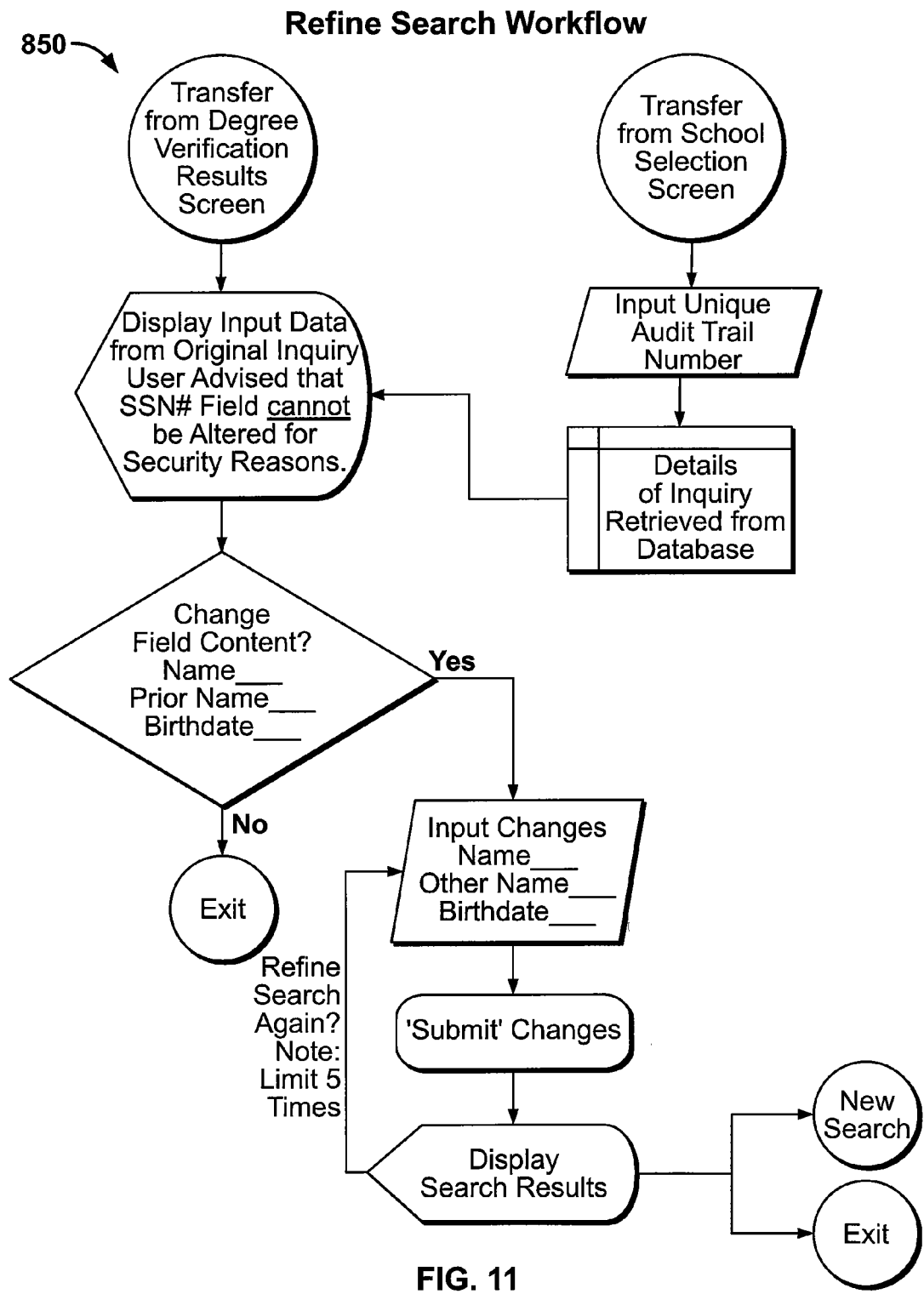
FIG. 11 is a flow chart diagram showing the sequence of events when the user chooses to refine a verification inquiry where the search engine returned results that show differences between the user's information and the school's records.

The user has significant flexibility in the combinations of search constraints that can be submitted to the website module 34 in the search. As shown in FIG. 9a, a number of different systemic responses may be triggered and subsequently displayed depending on what search constraints are inputted. For example, whether or not the individual being investigated exercised their legal rights under FERPA to block the release of any information, whether data was inputted correctly and whether the search engine 32 found a match. The specific fields are "customized" or authored by each school for use in responding to verification inquiries directed at each respective school. FIGS. 9b-9e illustrate the possible outcomes resulting from different combinations of search constraints. As shown in FIG. 11, the user may also refine the search constraints of some of the available input fields 76; some search constraints like social security numbers cannot be refined.

Figure 9E:
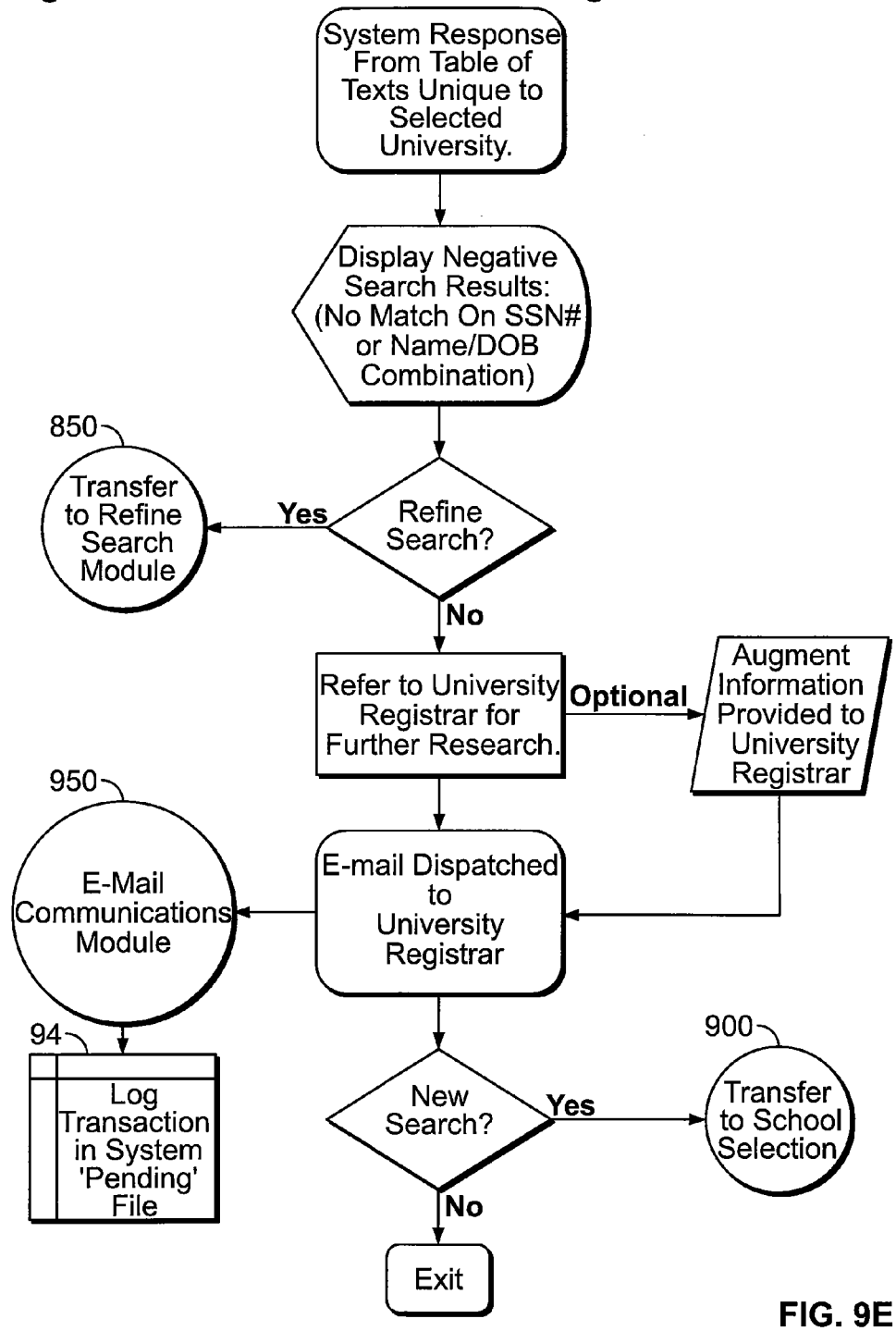
FIG. 9e is a flow chart diagram showing the sequence of events and user options when the search engine returns a negative result.
Figure 10:
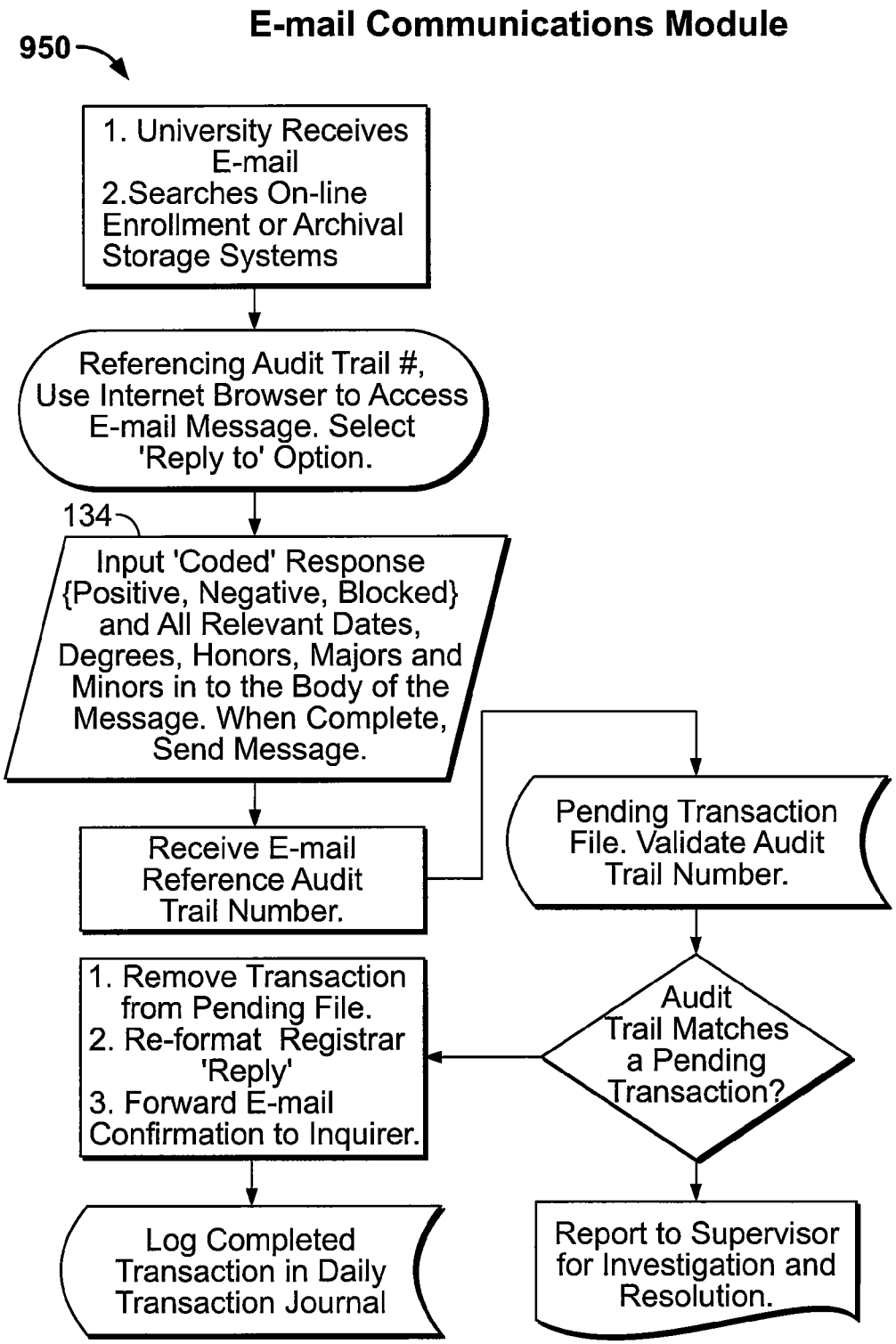
FIG. 10 is a flow chart diagram showing the sequence of events when the user chooses to refer a verification inquiry to the university registrar for further research or refinement.

Since the level of automation varies significantly between academic institutions, a user may submit an verification inquiry to verify a degree which is valid but which has not been placed in the secure database 30 yet. In this instance, the search engine 32 may return a negative result on a person with a valid degree from the school. In such cases, the system 10 warns the user that an error may exist, and that the verification inquiry should be referred to the Registrar for further research. As shown in FIG. 9e, the user may refer the search to the Registrar by clicking on the indicated button. The system then responds by asking the user for additional information to assist the registrar's in its search, and then automatically sends an e-mail message to a designated e-mail account in the respective registrar's office; this message could also be sent by facsimile. Concurrently with the previously mentioned steps, the transaction is recorded in a "Pending Registrar Review" file 94 until final disposition is achieved. As shown in FIG. 10, following an agreed upon manual procedure, the registrar researches the request and returns a coded registrar response using the "reply to sender" function provided by the e-mail or web browser application being used. Upon receipt, the system 10 verifies the unique audit trail number provided in the original transaction which has been stored in a "pending registrar review" file, de-codes and re-formats the registrar's reply and forwards a new confirmation of the transaction to the user's designated e-mail account.

In the case of current enrollment verification inquiries 88, a more simplistic approach is used with fewer options available to the User. The available input fields 76 are Social Security Number, current student I.D. number, student name. The "Other Name" field available in the degree verification module does not apply since the system 10 only verifies the name that a student is currently enrolled under. Similarly, the Institution's current enrollment database 87 is refreshed on a far more frequent basis than the degree database 85. Additionally, the "Refer to Registrar" option, as described above, is not available for current enrollment inquiries 88.

4. The Communication Module

The communication module 36 delivers referrals for additional research to University Registrars; receives, interprets and reformats any registrar responses; and routinely delivers confirmations of all verification inquiries to the users, all via e-mail or facsimile transmission. The communication module 36 is comprised of a DVTRACKER module 120 and a DVMAILER module 140. As shown in FIGS. 14a and 14b, the DVTRACKER 120 and DVMAILER module 140 allow the system 10 to monitor and process the verification inquiries that have been referred to the registrars. The respective functions of these two modules 120, 140 are discussed below.

A. The DVTRACKER Module

The DVTRACKER module 120, monitors the arrival of incoming mail 121 addressed to a specific user. Upon detecting that there is incoming mail 121 for a specific user, the DVTRACKER module 120 proceeds to process the incoming mail 121 by analyzing the mail 121 for a correct confirmation I.D. 122. The DVTRACKER module 120 then links the particular mail 121 to a prior verification inquiry that was referred to the registrar. When a valid confirmation I.D. 122 is found, the DVTRACKER module 120 parses the specially formatted mail 121 text in order to identify the search results. If the search results include actual degree information 124, the DVTRACKER module 120 then isolates the actual degree information 124 supplied by the registrar, which can be in a formatted or unformatted form. The degree information 124 consists of a result code field 125 and a degree information field 126 which is then written in the DVTRACERF1 database as part of a search results record 128 associated with the specific confirmation I.D. 122 contained in the mail 121. The DVTRACKER module 120 also updates the contents of the referral tracking record in the DVREFERDF1 database to reflect the change in the result code field 125 of this verification inquiry. The DVTRACER sub-module 66 places a "T" in the result code field 125 of the search result record 128 and causes the DVMAILER module 140 to complete the servicing of this verification inquiry by returning the search results to the user via either e-mail of fax. The last active date and time field 130 in the DVREFERDF1 record 133 is also updated at this time to provide audit trail information on the timing of the response from the registrar.

B. The DVMAILER Module

The DVMAILER Module continuously monitors the DVREFERDF1 database via the DVREFERDL1 logical view to see if any search result records 128 contain a result code field 125 of either:

"T" status, meaning that the search results are to be e-mailed or faxed to the user; or "S" status, meaning that the referral is older than a specific date and time.

If the result code field 125 contains an "S", the specific date and time field 130 are continuously updated by the DVMAILER module 140 according to a predefined interval used by the DVMAILER module 140 to determine whether a referral has been outstanding too long without a registrar response. Thus, the system 10 ensures that the registrar responds to the inquiring party in a timely fashion. If a particular verification inquiry is too old, then the system 10 will automatically route a reminder e-mail 145 to the registrar requesting a registrar response to the referral.

Upon finding search result records 128 with either of these two result codes, the DVMAILER module 140 will format an appropriate registrar response and route it to the user. Search result records 128 with a "T" in the result code field 125 are updated to a "C" to indicate that the verification inquiry is complete. Search result records 128 with an "S" in the result code field 125 will have their last active date and time field 130 updated to reflect the fact that a reminder e-mail 145 has been sent to the registrar. These updated fields will cause the communication module 36 to ignore these search result records 128 until they a gain get to a point where they are a gain old enough to require another reminder e-mail 145. Each time a reminder e-mail 145 is sent to a registrar, the DVMAILER module 140 will also send an internal e-mail 147 to an internal user/supervisor responsible for monitoring acceptable system 10 performance so that manual follow-up can also be initiated.

5. The Registrar Support Module

Figure 13:
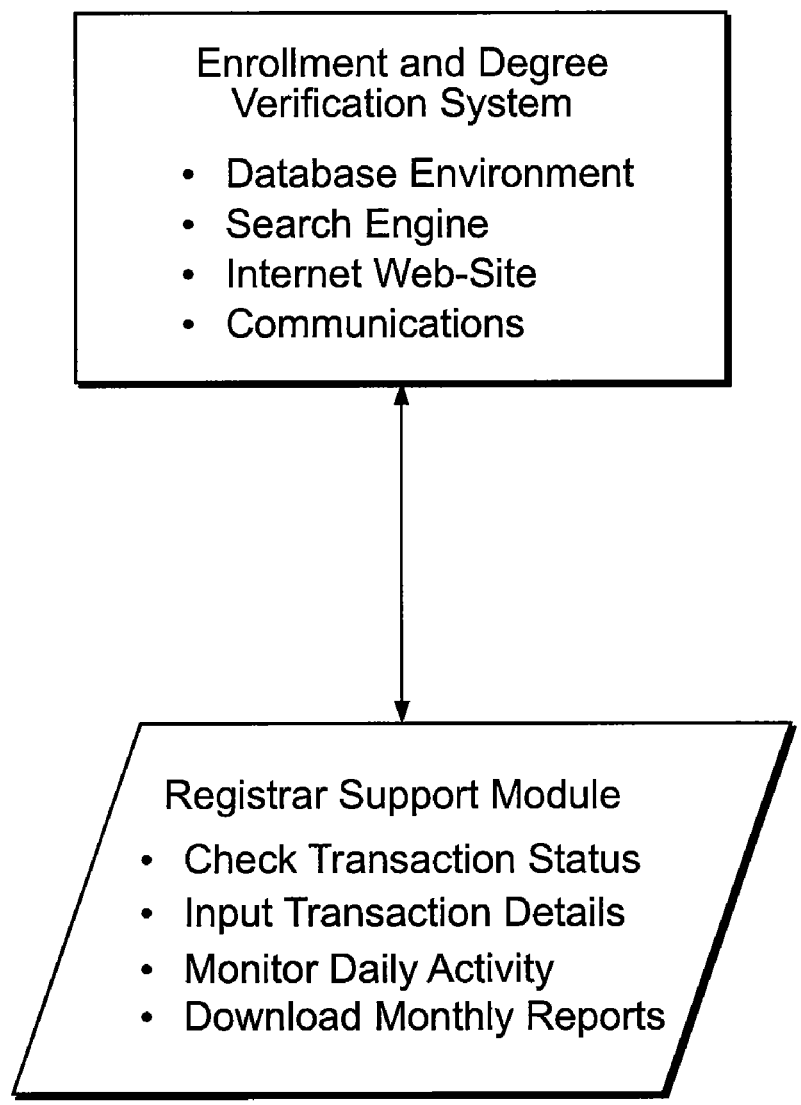
FIG. 13 is a flow chart diagram depicting the registrar support module.

The registrar support module 38 allows registrars to view verification inquiries that are pending and awaiting further research by university staff and as shown in FIG. 13, the registrar support module 38 is a function that is only accessible through the website module 34 by authorized, participating university registrars. The registrar support module 38 allows registrars to monitor intra-day verification activity, to respond to specific transactions by inputting search result records 128 directly into the communication module 36 and to download monthly activity reports.

While the invention has been particularly shown and described with reference to a particular embodiment thereof, it will be understood by those skilled in the art that various changes in form and detail may be made therein without departing from the spirit and scope of the invention. The present embodiment, therefore, is to be considered in all respects as illustrative and not restrictive, and the invention is not to be limited to the details given herein.

We claim:

1. A method for electronically verifying educational information, including:

receiving a verification inquiry comprised of a user specified search constraint at a server computer in communication with a searchable database comprising education information received from plurality of educational institutions, the educational information selected from the group consisting of enrollment and degree information;

a communication module of interfacing with and populating the database with educational information that is uploaded to the database from each of the respective educational institutions;

comparing the search constraint to the educational information within the database;

creating a response message at the server computer including inquiry response information representative of the educational information that was found during the comparison to be associated with the search constraint;

transmitting the response message to a requester computer; and determining a transaction status; and generating and uploading activity reports to a requestor computer and an institutional computer.

2. The method described in claim 1, wherein the search constraint further includes a primary variable and a secondary variable.

3. The method described in claim 2, wherein the primary variable further includes a variable selected from the group consisting of a school FICE number, a social security number, a last name, an other last name and a date of birth.

4. The method described in claim 3, wherein the secondary variable further includes a variable selected from the group consisting of a first name and a middle name.

5. The method described in claim 2, wherein the response message will be created in response to the primary variable.

6. The method described in claim 4, wherein the response message will be created in response to the primary variable and the secondary variable.

7. A system for verifying educational information, comprising:

a database for storing educational information from a plurality of educational institutions;

a communication module of interfacing with and populating the database with educational information that is uploaded to the database from each of the respective educational institutions;

a server computer which is capable of receiving a verification inquiry comprising a search constraint specified by a user wherein, upon receipt of the verification inquiry, the server compares the search constraint to the educational information within the database and creates a response message including inquiry response information representative of the educational information that was found during the comparison to be associated with the search constraint; and a user interface for creating the verification inquiry and displaying the response message to the user.

8. A method of providing a user with educational information in response to a verification inquiry, the method comprising:

receiving an electronic verification inquiry from a requestor computer, the verification inquiry further comprising a user specified search constraint;

searching a database stored on a server computer to determine if the database contains educational information that corresponds to the user specified search constraint, where the educational information is received from a plurality of educational institutions;

populating the database with educational information that is uploaded to the database from each of the respective educational institutions;

if the database contains educational information that corresponds to the search constraint, sending an electronic response message to the user comprised of inquiry response information that confirms or denies the accuracy of the educational information that is the subject of the user's electronic verification inquiry; and if the database does not contain educational information that corresponds to the search constraint, requesting a registrar support agent to perform an additional search and to provide information that corresponds to the search constraint to the user via an electronic message.

9. The method as recited in claim 8, wherein the requesting to registrar support agent to perform an additional search comprises forwarding the electronic verification inquiry to the registrar support agent for the requested educational information.

10. The method as recited in claim 8, wherein the electronic verification inquiry is received via the Internet.

11. The method as recited in claim 8, wherein the electronic verification inquiry is forwarded to the registrar support agent via an email.

12. The method as recited in claim 8, wherein the electronic verification inquiry is forwarded to the registrar support agent via the Internet.

13. The method as recited in claim 8, wherein the electronic message is forwarded to the user via the Internet.

14. The method as recited in claim 8, wherein the electronic message is forwarded to the user via an email.

15. The method as recited in claim 8, wherein the additional search is conducted independent of the server computer and the database.

* * * * *